United States Patent
Spisak

(10) Patent No.: US 11,120,106 B2
(45) Date of Patent: Sep. 14, 2021

(54) HARDWARE—ASSISTED SYSTEM AND METHOD FOR DETECTING AND ANALYZING SYSTEM CALLS MADE TO AN OPERATING SYSTEM KERNEL

(71) Applicant: Endgame, Inc., Arlington, VA (US)

(72) Inventor: Matthew D. Spisak, Columbus, OH (US)

(73) Assignee: Endgame, Inc., Arlington, VA (US)

( * ) Notice: Subject to any disclaimer, the term of this patent is extended or adjusted under 35 U.S.C. 154(b) by 0 days.

(21) Appl. No.: 15/224,521

(22) Filed: Jul. 30, 2016

(65) Prior Publication Data

US 2018/0032728 A1 Feb. 1, 2018

(51) Int. Cl.
G06F 21/00 (2013.01)
G06F 21/56 (2013.01)
G06F 21/12 (2013.01)
G06F 21/62 (2013.01)

(52) U.S. Cl.
CPC ............ *G06F 21/00* (2013.01); *G06F 21/126* (2013.01); *G06F 21/56* (2013.01); *G06F 21/563* (2013.01); *G06F 21/566* (2013.01); *G06F 21/121* (2013.01); *G06F 21/6281* (2013.01); *G06F 2221/034* (2013.01)

(58) Field of Classification Search
CPC ...... G06F 21/121; G06F 21/126; G06F 21/52; G06F 21/56; G06F 21/564; G06F 21/566; G06F 21/563; G06F 2221/034; G06F 21/567; G06F 21/6281; G06F 21/629; G06F 21/70; G06F 2221/2101; G06F 21/00
See application file for complete search history.

(56) References Cited

U.S. PATENT DOCUMENTS

| | | | |
|---|---|---|---|
| 5,481,684 A * | 1/1996 | Richter | G06F 9/30145 703/26 |
| 7,085,928 B1 | 8/2006 | Schmid et al. | |
| 7,640,589 B1 | 12/2009 | Mashevsky et al. | |
| 8,555,385 B1 * | 10/2013 | Bhatkar | G06F 21/556 726/22 |

(Continued)

FOREIGN PATENT DOCUMENTS

| | | |
|---|---|---|
| EP | 2784716 A1 | 10/2014 |
| EP | 3652639 A1 | 5/2020 |

(Continued)

OTHER PUBLICATIONS

Canzanese et al, System Call-based Detection of Malicious Processes, IEEE, 6 pages (Year: 2015).*

(Continued)

*Primary Examiner* — Huan V Doan
(74) *Attorney, Agent, or Firm* — Carr & Ferrell LLP

(57) ABSTRACT

The present disclosure relates to a system and method for monitoring system calls to an operating system kernel. A performance monitoring unit is used to monitor system calls and to gather information about each system call. The information is gathered upon interrupting the system call and can include system call type, parameters, and information about the calling thread/process, in order to determine whether the system call was generated by malicious software code. Potentially malicious software code is nullified by a malicious code counter-attack module.

23 Claims, 7 Drawing Sheets

(56) References Cited

U.S. PATENT DOCUMENTS

| | | | |
|---|---|---|---|
| 8,555,386 B1* | 10/2013 | Belov | G06F 21/566 726/22 |
| 9,055,093 B2* | 6/2015 | Borders | G06F 21/552 |
| 9,292,689 B1 | 3/2016 | Chuo | |
| 9,356,944 B1* | 5/2016 | Aziz | H04L 63/1425 |
| 9,407,648 B1* | 8/2016 | Pavlyushchik | G06F 9/544 |
| 9,509,697 B1 | 11/2016 | Salehpour | |
| 9,690,606 B1* | 6/2017 | Ha | G06F 21/566 |
| 10,397,255 B1* | 8/2019 | Bhalotra | H04L 63/1416 |
| 2003/0200464 A1* | 10/2003 | Kidron | H04L 63/0218 726/22 |
| 2004/0199763 A1* | 10/2004 | Freund | G06F 21/53 713/154 |
| 2005/0102601 A1 | 5/2005 | Wells | |
| 2005/0160313 A1 | 7/2005 | Wu | |
| 2006/0026569 A1 | 2/2006 | Oerting et al. | |
| 2006/0143707 A1* | 6/2006 | Song | G06F 21/52 726/22 |
| 2007/0180509 A1* | 8/2007 | Swartz | G06F 9/4406 726/9 |
| 2008/0034429 A1 | 2/2008 | Schneider | |
| 2008/0052468 A1* | 2/2008 | Speirs | G06F 13/4059 711/132 |
| 2008/0127292 A1 | 5/2008 | Cooper et al. | |
| 2008/0201778 A1* | 8/2008 | Guo | G06F 21/552 726/23 |
| 2009/0049550 A1* | 2/2009 | Shevchenko | G06F 21/52 726/23 |
| 2009/0077664 A1 | 3/2009 | Hsu et al. | |
| 2009/0187396 A1 | 7/2009 | Kinno et al. | |
| 2009/0222923 A1 | 9/2009 | Dixon | |
| 2010/0100774 A1* | 4/2010 | Ding | G06F 11/3636 714/45 |
| 2010/0293615 A1 | 11/2010 | Ye | |
| 2011/0167434 A1* | 7/2011 | Gaist | G06F 9/545 719/320 |
| 2012/0054299 A1 | 3/2012 | Buck | |
| 2012/0159625 A1 | 6/2012 | Jeong | |
| 2012/0246204 A1 | 9/2012 | Nalla et al. | |
| 2013/0283030 A1 | 10/2013 | Drew | |
| 2013/0332932 A1* | 12/2013 | Teruya | G06F 9/54 718/102 |
| 2013/0347111 A1* | 12/2013 | Karta | H04L 63/1441 726/23 |
| 2014/0032915 A1 | 1/2014 | Muzammil et al. | |
| 2014/0137184 A1* | 5/2014 | Russello | G06F 21/60 726/1 |
| 2014/0310714 A1 | 10/2014 | Chan et al. | |
| 2014/0380477 A1 | 12/2014 | Li | |
| 2015/0150130 A1* | 5/2015 | Fiala | G06F 21/56 726/23 |
| 2015/0264077 A1* | 9/2015 | Berger | G06F 21/554 726/23 |
| 2015/0278513 A1* | 10/2015 | Krasin | G06F 9/4881 726/30 |
| 2015/0295945 A1 | 10/2015 | Canzanese, Jr. et al. | |
| 2015/0339480 A1 | 11/2015 | Lutas et al. | |
| 2016/0180089 A1 | 6/2016 | Dalcher | |
| 2016/0232347 A1* | 8/2016 | Badishi | G06F 21/54 |
| 2016/0275289 A1 | 9/2016 | Sethumadhavan et al. | |
| 2016/0328560 A1 | 11/2016 | Momot | |
| 2016/0357958 A1 | 12/2016 | Guidry | |
| 2016/0364236 A1* | 12/2016 | Moudgill | G06F 9/3005 |
| 2017/0004309 A1 | 1/2017 | Pavlyushchik et al. | |
| 2018/0307840 A1* | 10/2018 | David | H04L 63/101 |
| 2019/0018958 A1 | 1/2019 | Desimone | |
| 2019/0018962 A1 | 1/2019 | Desimone | |

FOREIGN PATENT DOCUMENTS

| | | |
|---|---|---|
| EP | 3652667 A1 | 5/2020 |
| WO | WO2018026658 A1 | 2/2018 |
| WO | WO2019014529 A1 | 1/2019 |
| WO | WO2019014546 A1 | 1/2019 |

OTHER PUBLICATIONS

Canzanese et al., System Call-based Detection of Malicious Processes, 6 pages (Year: 2015).*

"International Search Report" and "Written Opinion of the International Searching Authority," Patent Cooperation Treaty Application No. PCT/US2018/042005, dated Oct. 1, 2018, 7 pages.

"International Search Report" and "Written Opinion of the International Searching Authority," Patent Cooperation Treaty Application No. PCT/US2018/041976, dated Sep. 28, 2018, 5 pages.

"International Search Report" and "Written Opinion of the International Searching Authority," Patent Cooperation Treaty Application No. PCT/US2017/044478, dated Oct. 10, 2017, 7 pages.

"Extended European Search Report", European Patent Application No. 18831224.3, dated Mar. 29, 2021, 8 pages.

* cited by examiner

Return Oriented Programming Malware Prevention 700

HARDWARE—ASSISTED SYSTEM AND METHOD FOR DETECTING AND ANALYZING SYSTEM CALLS MADE TO AN OPERATING SYSTEM KERNEL

FIELD OF THE DISCLOSURE

The present disclosure relates to a system and method for monitoring system calls to an operating system kernel. A performance monitoring unit is used to monitor system calls and to gather information about each system call. The information is gathered upon interrupting the system call and can include system call type, parameters, and information about the calling thread/process, in order to determine whether the system call was generated by malicious software code. Potentially malicious software code is nullified by a malicious code counter-attack module.

BACKGROUND

As computing devices become increasingly complex, malicious code such as viruses or malware also is becoming increasingly complex and difficult to detect and prevent. Continuous improvements are needed to identify and nullify such malicious code.

FIG. 1 depicts an exemplary prior art computer system 100 comprising processor 110 and memory 120. One of ordinary skill in the art will understand that processor 110 can include a single processor core or multiples processor cores as well as numerous cache memories, as is known in the prior art. Examples of processor 110 include Intel x86 and ARM-based processors.

Processor 110 runs operating system 130 (such as Windows, Linux, OSX, iOS, and Android) and software applications 160. Operating system 130 comprises kernel 140. Among other things, kernel 140 serves as an interface between other portions of operating system 130 and software applications 160 one the one hand and the actual hardware of processor 110 on the other hand. Kernel 140 also manages system resources for processor 110.

Processor 110 also comprises performance monitoring unit (PMU) 150. Performance monitoring unit 150 is used in many modern processor architectures, including ARM and Intel x86 processor architectures. Performance monitoring unit 150 is currently used for nonintrusive debugging and introspection, offering engineers or operating system 130 the ability to measure performance criteria of processor 110 such as CPU clock cycles, cache efficiency, or branch prediction efficiency and to help drive code optimizations. Performance monitoring unit 150 can be viewed as a counter of events within processor 110 using architecture-specific controls. Performance monitoring unit 150 can be configured to provide the data it captures to operating system 130 or software applications 160.

In FIG. 2, the concept of system calls is depicted. During operation of computer system 100, any of software applications 160 can send system call 210 to kernel 140. System call 210 is used to request a service from kernel 140, such as a hardware-related service (such as writing to a disk drive) or the creation of a new process within operating system 130. Although many system calls 210 are legitimate and desirable events, system calls 210 also can be used by malicious software (such as malware) to damage or misappropriate computer system 100 and/or a user's data.

In FIG. 3, malicious software code 310 sends system call 210 to kernel 140 for a malicious purpose. Malicious software code 310 can comprise an entire software application or just lines of code injected into a legitimate software application 160.

Operating system 130 and certain software applications 160 currently provide some mechanisms to monitor system calls 210. These mechanisms, however, are limited in their efficacy. Kernel patch protection exists in many operating systems 130 to prevent attackers from modifying and hooking system call dispatch tables. As a result, those software applications 160 that are intended to identify suspicious system calls are limited to user-space injection and hooking and do not operate at the level of kernel 140. Thus, while kernel patch protection attempts to restrict the capabilities of malicious code, it also limits the ability to monitor and detect malicious system calls.

What is needed is a mechanism to monitor system calls 210 and/or other interrupts and to gather information about each system call 210 and other interrupt in a way that avoids the kernel patch protection and the limitations of existing mechanisms. What is further needed to a mechanism to analyze the gathered information and to counter-attack potentially malicious code.

BRIEF SUMMARY OF THE INVENTION

In one aspect of the invention, performance monitoring unit 150 is used to monitor system calls 210 and to gather information about each system call 210. In the prior art, performance monitoring unit 150 has not been configured and used for this purpose. The data gathered by performance monitoring unit 150 can be analyzed to identify system calls 210 that potentially have been generated by malicious software code 310.

DETAILED DESCRIPTION OF PREFERRED EMBODIMENTS

Figure 1:
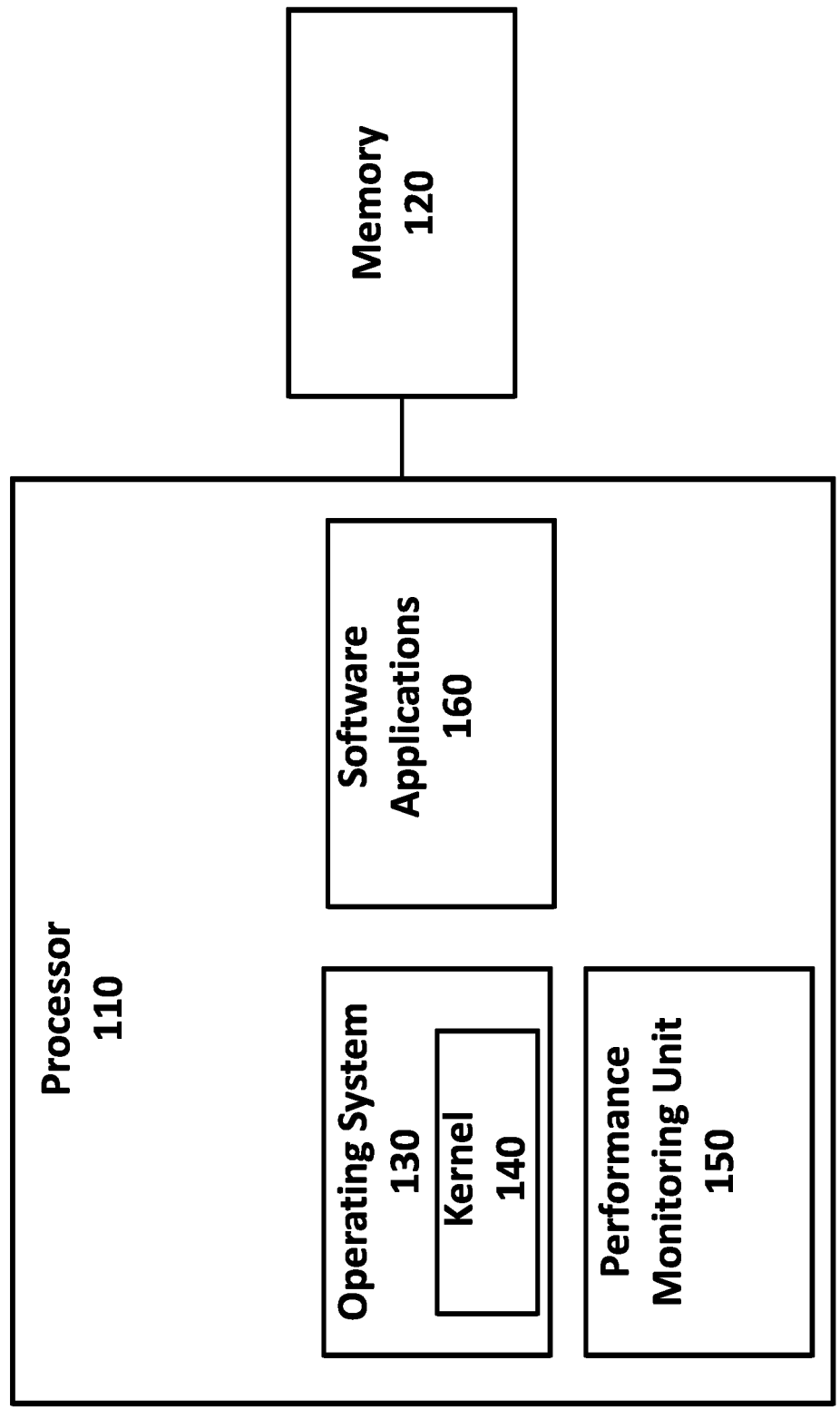
FIG. 1 depicts a prior art computing device.
Figure 2:
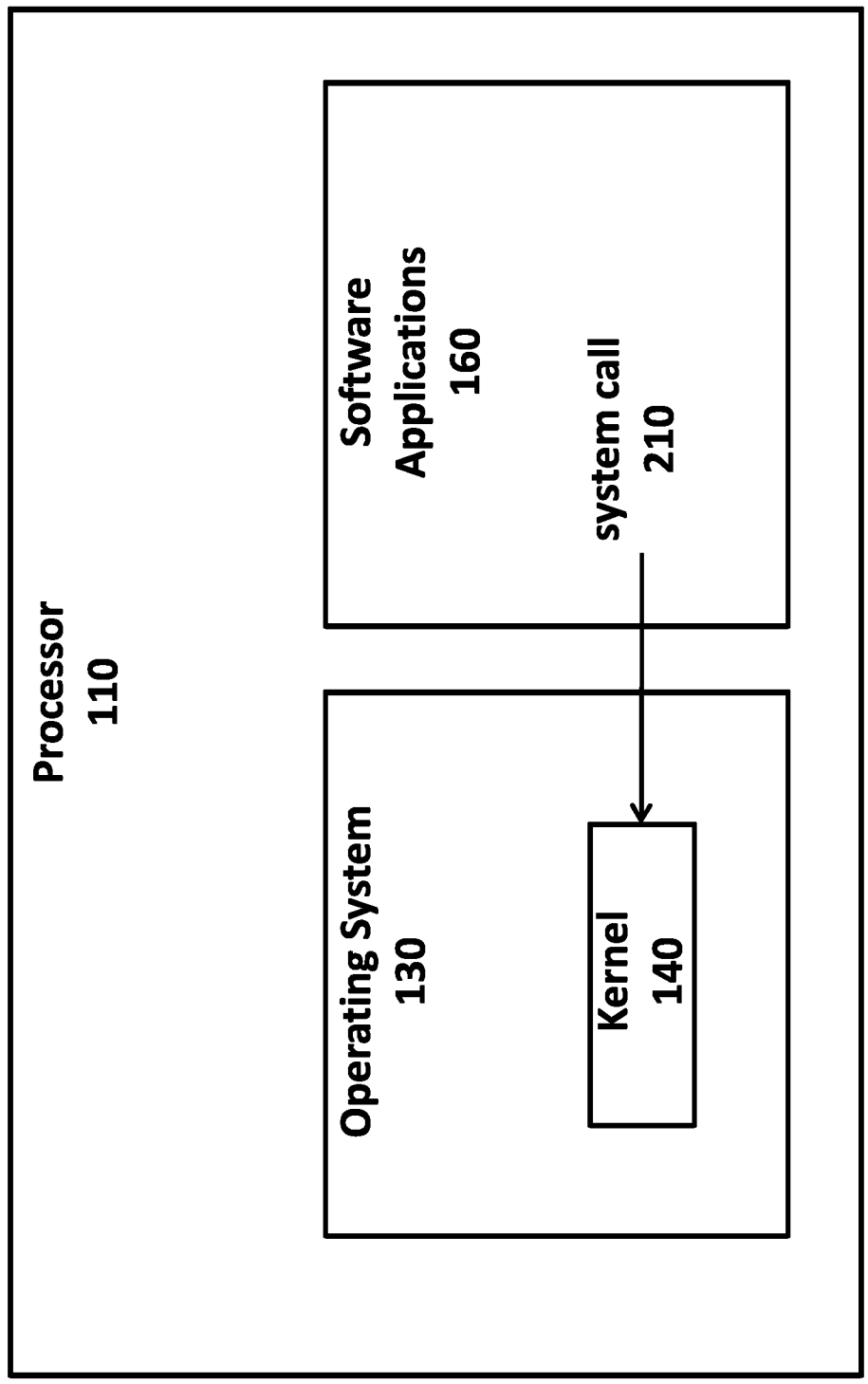
FIG. 2 depicts a system call generated by a software application to the kernel of an operating system.
Figure 3:
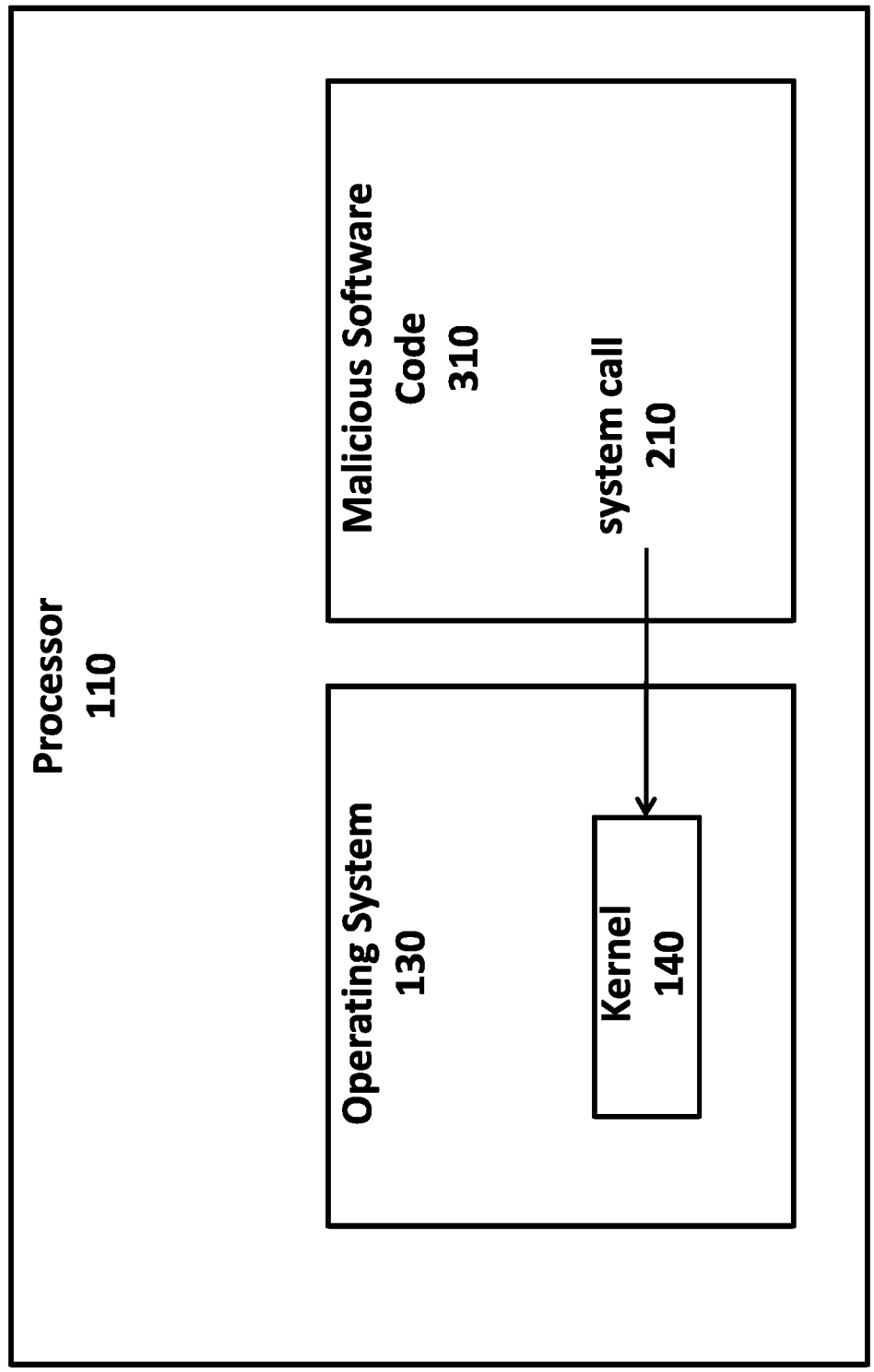
FIG. 3 depicts a system call generated by malicious software code to the kernel of an operating system.
Figure 4:
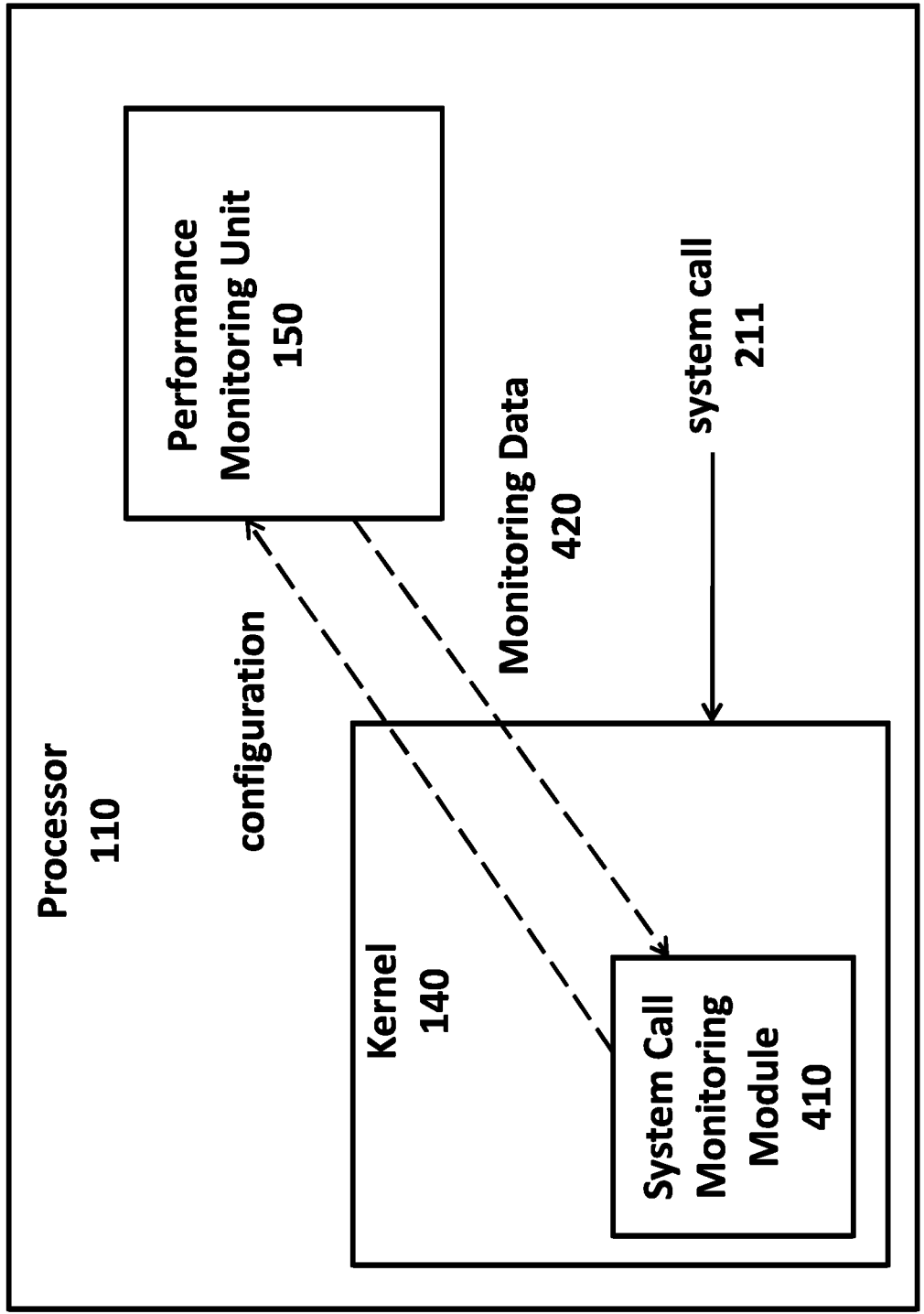
FIG. 4 depicts an embodiment comprising a hardware-assisted system and method for detecting system calls made to an operating system kernel.

An embodiment is shown in FIG. 4. System call monitoring module 410 is executed by processor 110. System call monitoring module 410 has special privileges and operates at the level of kernel 140, and for purposes of this description can be considered as part of kernel 140. System call monitoring module 410 configures performance monitoring unit 150 to trap system calls 210, to gather the arguments for each system call 210, and to provide some or all of the arguments of system call 210 to system call monitoring module 410 as monitoring data 420. System call monitoring module 410 optionally can configure performance monitoring unit 150 to trap other types of interrupts in addition to system calls 210.

If processor 110 follows an ARM architecture, performance monitoring unit 150 can be configured to count and trap supervisor call instructions (which is an example of system call 210). The supervisor call exception vector is typically utilized by many operating systems (e.g. Android) to service system calls. As a result, trapping supervisor call instructions can effectively trap all system calls.

If processor 110 follows an Intel x86 architecture, performance monitoring unit 150 can be configured to count Far branches that are destined for kernel 140. This effectively encapsulates the Intel SYSCALL instruction (which generates system call 210) as well as various other hardware driven interrupts such as page faults. This enables the trapping and analyses of critical operating system events.

Returning to FIG. 4, system call 211 is generated and sent to kernel 140. System call 211 here is a specific instance of system call 210 described previously. At this moment in time, it is unclear whether system call 211 has been generated by software application 160 and is a legitimate system call or by malicious software code 310 and is a harmful system call. Monitoring data 420 here will include some or all of the arguments of system call 211.

Figure 5:
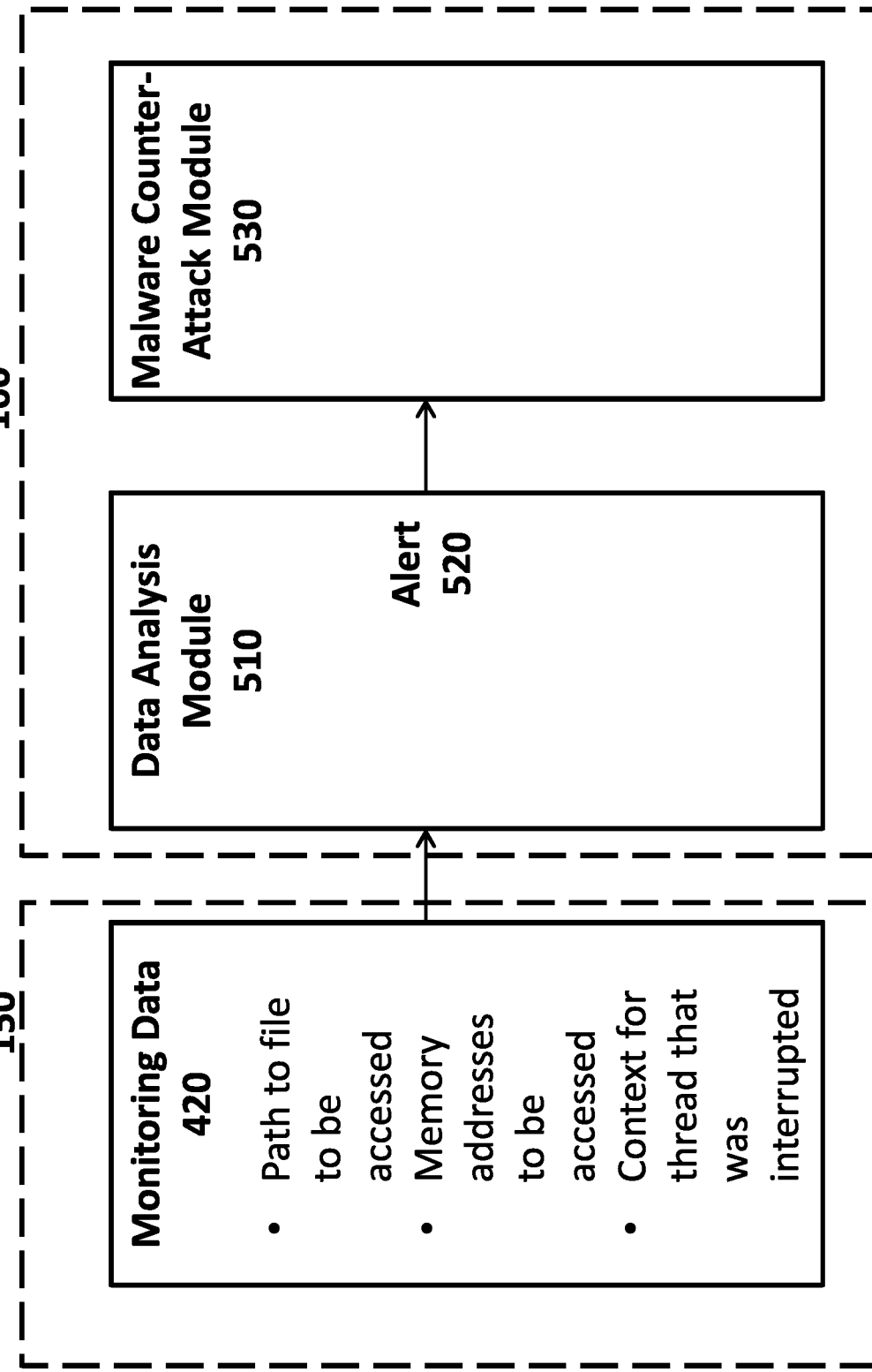
FIG. 5 depicts an embodiment for analyzing data generated by the embodiment of FIG. 4 and to counteract potential malware.
Figure 6:
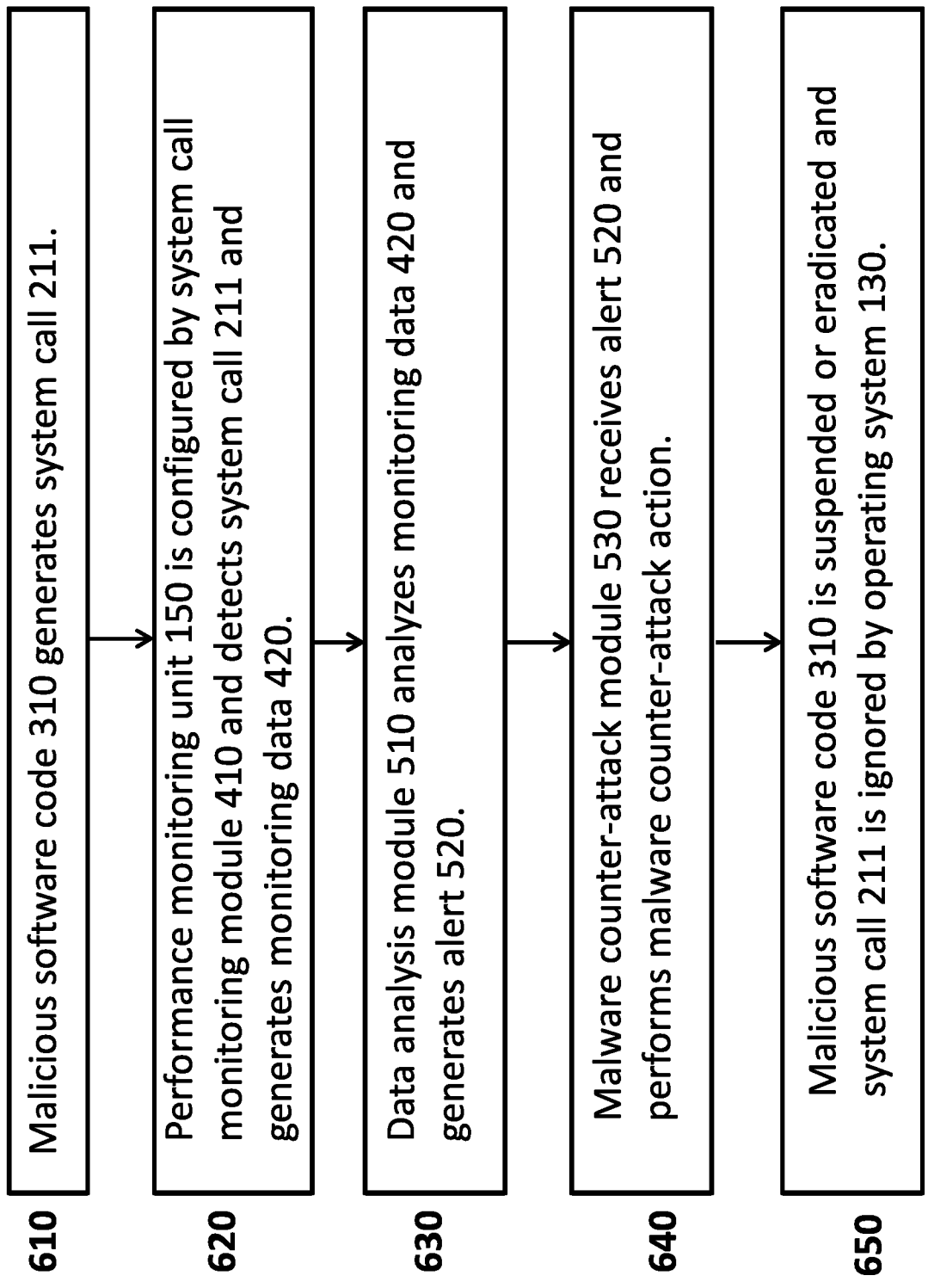
FIG. 6 depicts a method for detecting and analyzing system calls made to an operating system kernel, analyzing related data, and counteracting potential malware.

With reference to FIG. 5, monitoring data 420 can comprise:
information about the path to the file to be accessed by system call 211;
the memory address or range of addresses to be accessed by system call 211;
the context for the thread within operating system 130 that will be interrupted by system call 211;
the type of system call;
information about the socket that is being used by system call 211 in order to send or receive data;
the history of system calls in order to monitor for specific sequences of system calls 211;
the frequency or periodicity of a particular system call or set of systems calls; and
other information.

Monitoring data 420 is provided to data analysis module 510, which is a software application 160. Data analysis module 510 uses known data analysis algorithms (such as machine learning algorithms, artificial intelligence algorithms, pattern recognition algorithms, or other known data analysis techniques) to analyze monitoring data 420 in light of previously stored data. Data analysis module 510 has the ability to learn from the previously stored data and monitoring data 420. Data analysis module 510 can generate alert 520 if it determines that system call 211 likely has been generated by malicious software code 310.

Alert 520 is provided to malware counter-attack module 530, which also is a software application 160. Malware counter-attack module 530 can perform one or more of the following actions:
identify malicious software code 310;
suspend malicious software code 310 from being further executed by processor 110;
delete malicious software code 310;
add malicious software code 310 to a list of code to not be executed;
instruct kernel 140 to ignore system call 211;
capture/save memory containing malicious code for further offline analysis;
modify malicious software code 310 to cause alternate behavior; and
other techniques for counter-attacking malicious software code 310.

Figure 7:
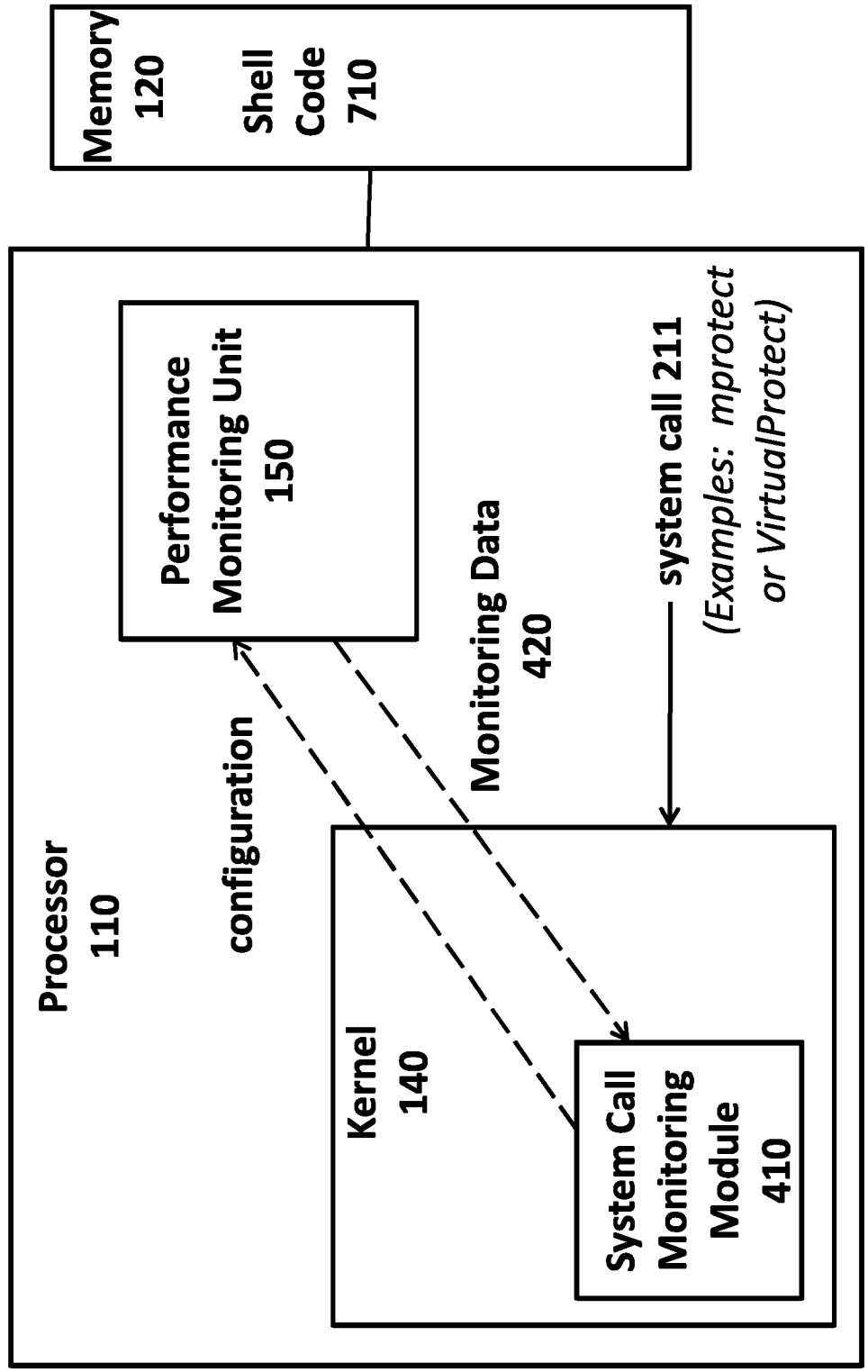
FIG. 7 depicts the use of the embodiments to counteract a malware attack that utilizes return-oriented programming.

An example of a specific use case of the above embodiments is shown in FIG. 7. Return oriented programming malware prevention system 700 is depicted using components previously described in other Figures. Malicious shell code 710 is injected into memory 120 by a virus or other malware agent. Code-reuse attacks such as Return-Oriented Programming often rely on an attacker reusing existing code gadgets in order to mark malicious shell code 710 in memory 120 as executable before branching to it. This often requires the use of a system call 210 such as mprotect (when operating system 130 is Linux or Android) or VirtualProtect (when operating system 130 is Windows). Using the embodiments described herein, system 700 is able to detect and prevent return-oriented programming attacks.

An example of a specific use case of the above embodiments is shown in FIG. 7. Return oriented programming malware prevention system 700 is depicted using components previously described in other Figures. Malicious shell code 710 is injected into memory 120 by a virus or other malware agent. Code-reuse attacks such as Return-Oriented Programming often rely on an attacker reusing existing code gadgets in order to mark malicious shell code 710 in memory 130 as executable before branching to it. This often requires the use of a system call 210 such as mprotect (when operating system 130 is Linux or Android) or VirtualProtect (when operating system 130 is Windows). Using the embodiments described herein, system 700 is able to detect and prevent return-oriented programming attacks.

In another use case, monitoring of system calls 210 can be utilized to detect malicious software code 310 at various stages ranging from early shellcode to advanced persistent malware. The embodiments can be used to not only detect an initial malicious attack, but also to counter-attack malware that is running on a system that has already been infected.

In another use case, trapping Far branches in processor 110 (when processor 110 follows the Intel x86 architecture) allows the system to interrupt the page fault handler running within operating system 130 (when operating system 130 is Windows). This will allow malware detection to apply memory protection policies that could detect exploitation attempts prior to any control-flow hijack even taking place.

The embodiments described above provide a new system and method for detecting system calls using a module operating at the kernel level and the performance monitoring unit of a processor. Monitoring data is collected for each system call and analyzed using a data analysis module, which generates alerts that identify potential malicious software code. Any malicious software code can be counteracted by a malicious code counter-attack module.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A system for identifying and analyzing system calls to identify potentially malicious software code, the system comprising:
   a processor comprising a performance monitoring unit and configured to run an operating system, the operating system comprising a kernel;
   a system call monitoring module, executed by the processor, for configuring the performance monitoring unit to:
      identify a system call to the kernel, by counting one or more FAR branches that are destined for the kernel, thereby encapsulating a system call instruction that generates the system call, wherein the system call comprises the one or more FAR branches; and
      generate monitoring data from the system call that comprises at least two of information about a path to a file to be accessed by the system call, a memory address or range of addresses to be accessed by the system call, information about a socket that is being used by the system call in order to send or receive data, as well as history of system calls in order to monitor for specific sequences of system calls; and
   a data analysis module, executed by the processor, to analyze the monitoring data in light of previously stored data, to learn from the previously stored data and the monitoring data, and to generate an alert based on the monitoring data, the alert indicating that the system call was generated by potentially malicious software code.

2. The system of claim 1, further comprising:
   a malware counter-attack module, executed by the processor, for receiving the alert and performing an action involving the potentially malicious software code.

3. The system of claim 2, wherein the action comprises suspending the potentially malicious code from being further executed by the processor.

4. The system of claim 2, wherein the action comprises deleting the potentially malicious code.

5. The system of claim 2, wherein the action comprises adding the potentially malicious code to a list of code to not be executed by the processor.

6. The system of claim 2, wherein the action comprises instructing the kernel to ignore the system call.

7. The system of claim 1, wherein the system call comprises a supervisor call instruction.

8. The system of claim 1, wherein the monitoring data further comprises a context for a thread within the operating system that will be interrupted by the system call.

9. The system of claim 1, wherein the system call comprises an Mprotect or VirtualProtect instruction.

10. A method for identifying and analyzing system calls to identify potentially malicious software code in a system comprising a processor, the processor further comprising a performance monitoring unit, the method comprising:
    running, by the processor, an operating system comprising a kernel;
    configuring, by a system call monitoring module, the performance monitoring unit;
    identifying, by the performance monitoring unit, a system call to the kernel, by counting one or more FAR branches that are destined for the kernel, thereby encapsulating a system call instruction that generates the system call, wherein the system call comprises the one or more FAR branches;
    generating monitoring data that comprises at least two of information about a path to a file to be accessed by the system call, a memory address or range of addresses to be accessed by the system call, information about a socket that is being used by the system call in order to send or receive data, as well as history of system calls in order to monitor for specific sequences of system calls;
    analyzing the monitoring data, by a data analysis module, in light of previously stored data;
    learning, by the data analysis module, from the previously stored data and the monitoring data; and
    generating, by the data analysis module, an alert based on the monitoring data, the alert indicating that the system call was generated by potentially malicious software code.

11. The method of claim 10, further comprising:
    receiving, by a malware counter-attack module, the alert; and
    performing, by the malware counter-attack module, an action involving the potentially malicious software code.

12. The method of claim 11, wherein the action comprises suspending the potentially malicious code from being further executed by the processor.

13. The method of claim 11, wherein the action comprises deleting the potentially malicious code.

14. The method of claim 11, wherein the action comprises adding the potentially malicious code to a list of code to not be executed by the processor.

15. The method of claim 11, wherein the action comprises instructing the kernel to ignore the system call.

16. The method of claim 10, wherein the system call comprises a supervisor call instruction.

17. The method of claim 10, wherein the monitoring data further comprises a context for a thread within the operating system that will be interrupted by the system call.

18. The method of claim 10, wherein the system call comprises an Mprotect or VirtualProtect instruction.

19. A non-transitory computer-readable storage medium having embodied thereon a program, the program executable by a processor to perform a method for identifying and analyzing system calls to identify potentially malicious software code in a system comprising a processor, the processor further comprising a performance monitoring unit, the method comprising:
    running, by the processor, an operating system comprising a kernel;
    configuring, by a system call monitoring module, the performance monitoring unit;
    identifying, by the performance monitoring unit, a system call to the kernel, by counting one or more FAR branches that are destined for the kernel, thereby encapsulating a system call instruction that generates the system call, wherein the system call comprises the one or more FAR branches;
    generating monitoring data from the system call that comprises at least two of information about a path to a file to be accessed by the system call, a memory address or range of addresses to be accessed by the system call, information about a socket that is being used by the system call in order to send or receive data, as well as history of system calls in order to monitor for specific sequences of system calls;

analyzing the monitoring data, by a data analysis module, in light of previously stored data;

learning, by the data analysis module, from the previously stored data and the monitoring data; and generating, by the data analysis module, an alert based on the monitoring data, the alert indicating that the system call was generated by potentially malicious software code.

20. The non-transitory computer-readable storage medium of claim 19, the method further comprising:

receiving the alert and performing an action involving the potentially malicious software code.

21. The non-transitory computer-readable storage medium of claim 20, wherein the action comprises suspending or deleting the potentially malicious code from being further executed by the processor.

22. The non-transitory computer-readable storage medium of claim 20, wherein the action comprises adding the potentially malicious code to a list of code to not be executed by the processor.

23. The non-transitory computer-readable storage medium of claim 20, wherein the action comprises instructing the kernel to ignore the system call.

\* \* \* \* \*